United States Patent
Hsu

(10) Patent No.: US 9,256,744 B2
(45) Date of Patent: Feb. 9, 2016

(54) SYSTEM-ON-CHIP AND BOOTING METHOD THEREOF

(71) Applicant: Ming-Wei Hsu, New Taipei (TW)

(72) Inventor: Ming-Wei Hsu, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 261 days.

(21) Appl. No.: 13/858,112

(22) Filed: Apr. 8, 2013

(65) Prior Publication Data

US 2013/0268746 A1    Oct. 10, 2013

Related U.S. Application Data

(60) Provisional application No. 61/622,017, filed on Apr. 10, 2012.

(30) Foreign Application Priority Data

Mar. 14, 2013  (TW) .............................. 102109076 A

(51) Int. Cl.
G06F 21/57 (2013.01)
G06F 9/44 (2006.01)
G06F 11/14 (2006.01)

(52) U.S. Cl.
CPC ............ *G06F 21/572* (2013.01); *G06F 9/4401* (2013.01); *G06F 11/1417* (2013.01)

(58) Field of Classification Search
CPC .. G06F 21/572; G06F 9/4401; G06F 11/1417
USPC ............................................................. 713/2
See application file for complete search history.

(56) References Cited

U.S. PATENT DOCUMENTS

| | | | |
|---|---|---|---|
| 7,069,431 B2 * | 6/2006 | Dayan et al. | 713/2 |
| 7,240,188 B2 * | 7/2007 | Takata et al. | 713/1 |
| 8,065,510 B2 * | 11/2011 | Hanes | 713/2 |
| 8,181,007 B2 | 5/2012 | Liu | |
| 8,590,040 B2 * | 11/2013 | Ghetie et al. | 726/22 |
| 8,607,216 B2 * | 12/2013 | Ibrahim et al. | 717/168 |
| 9,015,455 B2 * | 4/2015 | Held et al. | 713/1 |
| 2010/0180108 A1 | 7/2010 | Liu | |

FOREIGN PATENT DOCUMENTS

| | | |
|---|---|---|
| CN | 101526908 | 9/2009 |
| TW | 200713037 | 4/2007 |
| TW | 201027324 | 7/2010 |

* cited by examiner

*Primary Examiner* — Stefan Stoynov
(74) *Attorney, Agent, or Firm* — Jianq Chyun IP Office

(57) ABSTRACT

A system-on-chip (SoC) and a booting method thereof are disclosed. The SoC is coupled to an external memory and includes a read only memory (ROM) and a processor. The ROM stores a first firmware image. The processor is coupled to the ROM. The processor reads the first firmware image from the ROM and verifies the state of the first firmware image. If the first firmware image is damaged, the processor reads a second firmware image from the external memory and verifies whether the second firmware image is legal. If the verification of the second firmware image succeeds, the processor reads and executes the second firmware image to perform a booting process.

15 Claims, 4 Drawing Sheets

SYSTEM-ON-CHIP AND BOOTING METHOD THEREOF

CROSS-REFERENCE TO RELATED APPLICATION

This application claims the priority benefits of U.S. provisional application Ser. No. 61/622,017, filed on Apr. 10, 2012 and Taiwan application serial no. 102109076, filed on Mar. 14, 2013. The entirety of each of the above-mentioned patent applications is hereby incorporated by reference herein and made a part of this specification.

BACKGROUND OF THE INVENTION

1. Field of the Invention

The present disclosure generally relates to a chip, and more particularly, to a system-on-chip (SoC) and a booting method thereof.

2. Description of Related Art

A system-on-chip (SoC) or system-level integration (SLI) is a complete computer system integrated into a single chip or integrated circuit (IC). For example, a SoC may includes a central processing unit (CPU), a memory, and some peripheral circuits. The concept of SoC is to minimize and/or modularize circuits in a specific application field and integrate most functions offered by this application field into a single chip or IC, so as to reduce the size of a product and/or increase the portability thereof.

During the booting process of a SoC, the CPU of the SoC obtains a single firmware image from a storage medium and executes the firmware image to boot up. However, if the firmware image is damaged or cannot be completely read, the SoC cannot be boot up properly.

SUMMARY OF THE INVENTION

Accordingly, the present disclosure is directed to a system-on-chip (SoC) and a booting method thereof, in which the flexibility in using a firmware when the SoC is boot up is effectively improved.

The present disclosure provides a SoC. The SoC is coupled to an external memory and includes a read only memory (ROM) and a processor. The ROM stores a first firmware image. The processor is coupled to the ROM. The processor reads a first firmware image from the ROM and verifies whether the first firmware image is damaged.

If the first firmware image is a normal firmware image, the processor executes the first firmware image to perform a booting process. If the first firmware image is damaged, the processor reads a second firmware image from the external memory and verifies whether the second firmware image is a legal firmware image. If the verification of the second firmware image succeeds, the processor executes the second firmware image to perform the booting process.

The present disclosure provides a booting method. The booting method is adapted to a SoC. The SoC includes a processor. The booting method includes following steps. A ROM is provided, where the ROM stores a first firmware image. An external memory is provided, where the external memory stores a second firmware image. The first firmware image is read from the ROM and whether the first firmware image is damaged is verified by using the processor. If the first firmware image is a normal firmware image, the first firmware image is executed to perform a booting process. If the first firmware image is damaged, a second firmware image is read from the external memory, and whether the second firmware image is legal is verified. If the verification of the second firmware image succeeds, the second firmware image is executed to perform the booting process.

As described above, the present disclosure provides a SoC and a booting method thereof, in which two or more firmware images are provided in advance, so that during the booting process of the SoC, a legal and/or complete firmware image can be loaded to complete the booting process.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
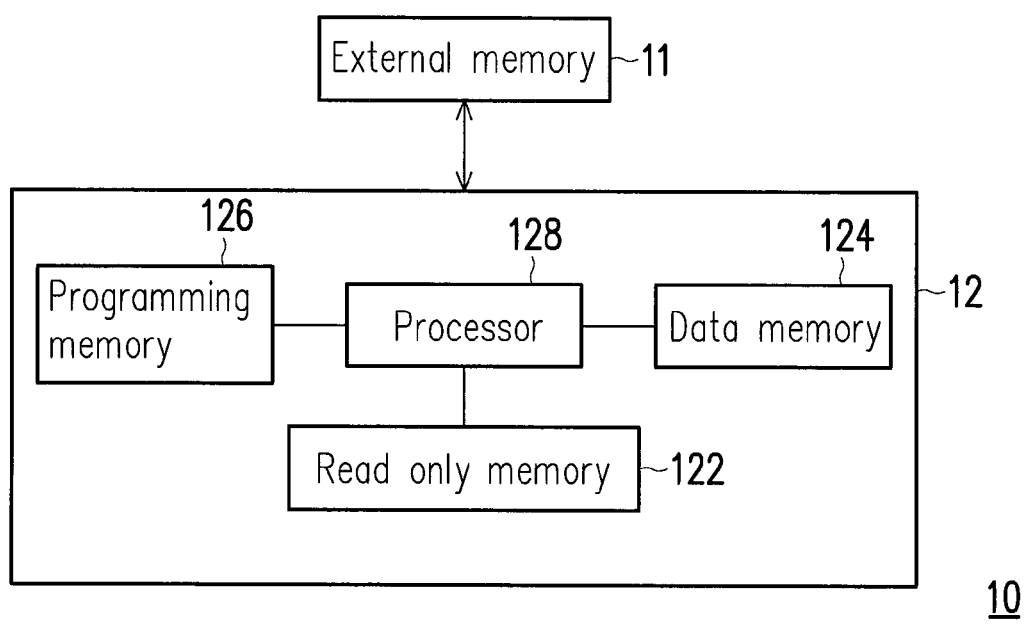
FIG. 1 is a diagram illustrating the booting system of a system-on-chip (SoC) according to an embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a diagram illustrating the booting system of a system-on-chip (SoC) according to an embodiment of the present disclosure. Referring to FIG. 1, the SoC booting system 10 includes an external memory 11 and a SoC 12. The external memory 11 is any storage medium for storing data, such as a flash memory. The SoC 12 is an integrated circuit that integrates various electronic circuits (for example, a processor and a memory) into a single chip, such as a SoC suitable for processing universal serial bus (USB) 2.0 or USB 3.0 signals. However, the type of the SoC 12 is not limited in the present disclosure. The external memory 11 and the SoC 12 are coupled with each other through a bus, such as a serial peripheral interface (SPI) bus.

The SoC 12 includes a read only memory (ROM) 122, a data memory 124, a programming memory 126, and a processor 128. The ROM 122 stores data written when the SoC 12 is manufactured. The data memory 124 and the programming memory 126 may be random access memories (RAM). In particular, because the programming memory 126 is mainly used for storing binary codes while the data memory 124 is mainly used for storing other types of data, programming memory 126 should offer a faster access speed, while the access speed of the the data memory 124 is not limited. The processor 128 is the core element of the SoC 12, and which is in charge of the operation of the entire SoC 12 and provides calculation and data processing functions.

In the present embodiment, the ROM 122 stores a first firmware image, the external memory 11 stores a second firmware image, and these two firmware images respectively carry settings and/or drivers of different components or electronic circuits in the SoC 12. The first firmware image and the second firmware image may be the same or different. For example, the second firmware image may be a backup of the first firmware image. Or, the first firmware image and the second firmware image may also be a firmware image of different versions (for example a driver of different versions). However, the contents of the first firmware image and the second firmware image can be determined according to the actual requirement.

When the first firmware image stored in the ROM 122 is damaged or the processor 128 can not read the first firmware image completely, the processor 128 reads the second firmware image from the external memory 11 and performs the booting process of the SoC 12 by using the second firmware image instead.

Figure 2:
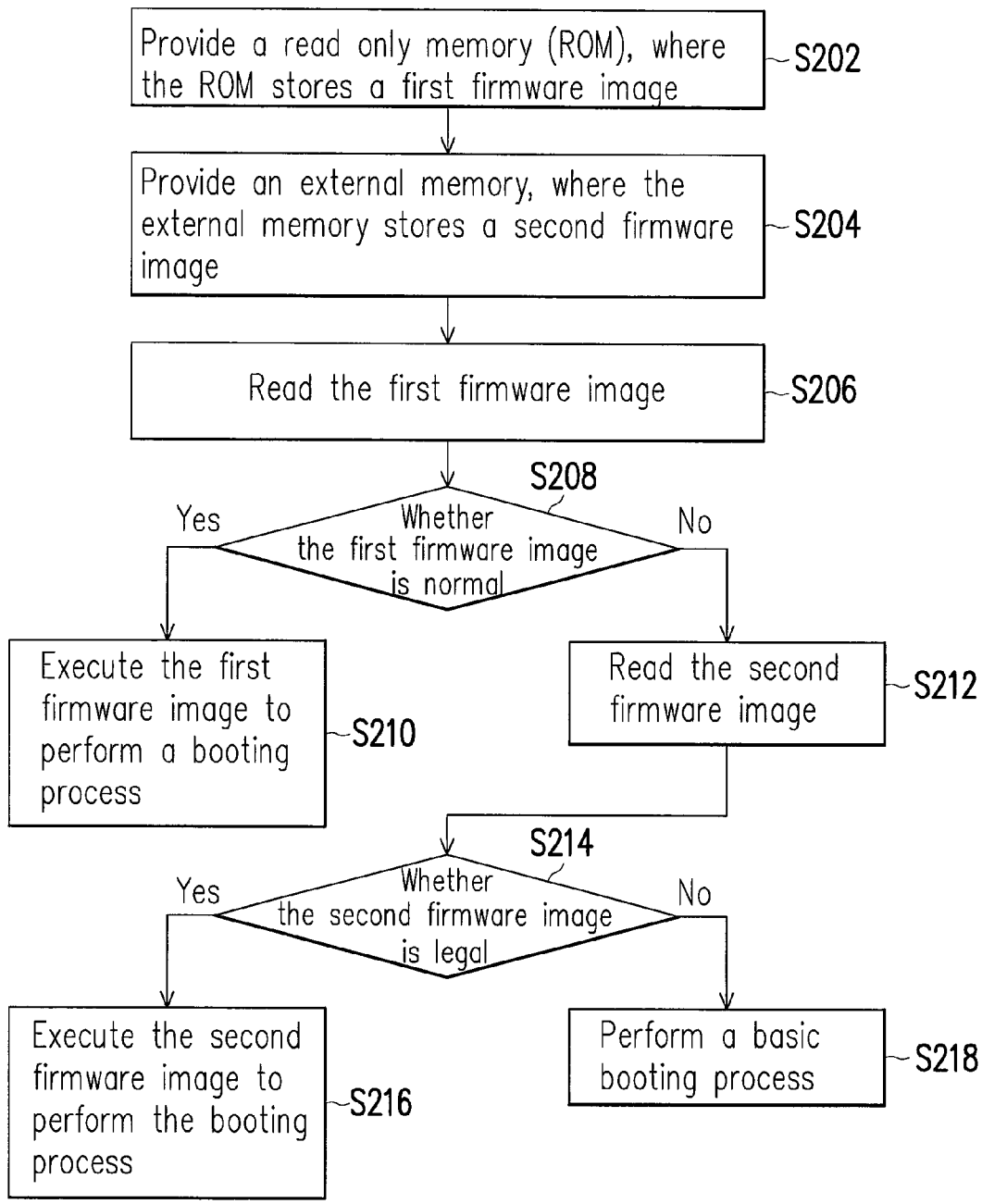
FIG. 2 is a flowchart of a booting method according to an embodiment of the present disclosure.

FIG. 2 is a flowchart of a booting method according to an embodiment of the present disclosure. Below, the booting method will be described in detail with reference to the SoC booting system 10 and FIG. 2. Referring to both FIG. 1 and FIG. 2, in step S202, a ROM 122 is provided, where the ROM 122 stores a first firmware image. In step S204, an external memory 11 is provided, where the external memory 11 stores a second firmware image.

In step S206, when the processor 128 detects a booting signal or that the SoC 12 is powered on, the processor 128 reads the first firmware image from the ROM 122. Then, in step S208, the processor 128 verifies whether the first firmware image is a normal or complete firmware image.

If the first firmware image is a normal and complete firmware image, in step S210, the processor 128 executes the first firmware image to perform the booting process. If the first firmware image is a damaged or incomplete firmware image, in step S212, the processor 128 reads the second firmware image from the external memory 11 and executes the same.

Next, in step S214, the processor 128 verifies whether the second firmware image is legal or complete. If the second firmware image is legal and/or complete, in step S214, the processor 128 executes the second firmware image to perform the booting process.

If the second firmware image is incomplete and/or illegal, in step S216, the processor 128 performs a basic booting process stored in the ROM 122 to boot up the SoC 12 in a limited condition. Particularly, if the processor 128 boots up the SoC 12 through only the basic booting process, most components and/or electronic circuits in the SoC 12 may not be completely driven (because detailed settings and/or driving information is defined in a firmware image), and accordingly the number of functions provided by the SoC 12 may be considerably reduced.

Figure 3:
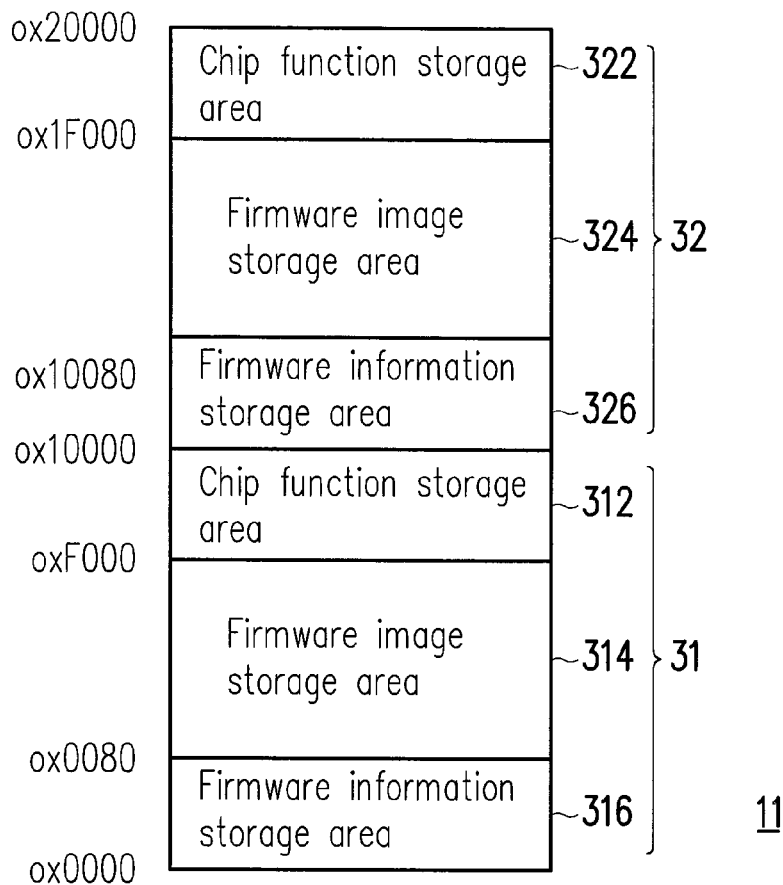
FIG. 3 is a diagram of an external memory storing firmware images according to an embodiment of the present disclosure.

FIG. 3 is a diagram of an external memory storing firmware images according to an embodiment of the present disclosure. Referring to FIG. 3, the ROM 122 has a first storage area 31, and the external memory 11 has a second storage area 32. The first storage area 31 stores the first firmware image and a first assisting data, and the second storage area 32 stores the second firmware image and a second assisting data.

To be specific, the first storage area 31 includes a chip function storage area 312, a firmware image storage area 314, and a firmware information storage area 316. The chip function storage area 312 stores some additional setting information of the SoC 12, such as the power settings of different devices in the SoC 12. The firmware image storage area 314 stores the first firmware image. The firmware information storage area 316 stores user-defined information related to the first firmware image, such as a user name, user-defined strings, and/or time-out settings.

The chip function storage area 312 and the firmware information storage area 316 store the first assisting data. Similarly, the second storage area 32 includes a chip function storage area 322, a firmware image storage area 324, and a firmware information storage area 326. The chip function storage area 322 stores some additional setting information of the SoC 12. The firmware image storage area 324 stores the second firmware image. The firmware information storage area 326 stores user-defined information related to the second firmware image. The chip function storage area 322 and the firmware information storage area 326 store the second assisting data. However, the present disclosure is not limited thereto.

In the present disclosure, the ROM 122 and/or the external memory 11 may further include other storage areas for storing other firmware images (for example, a third firmware image) and/or assisting data (for example, a third assisting data).

Figure 4:
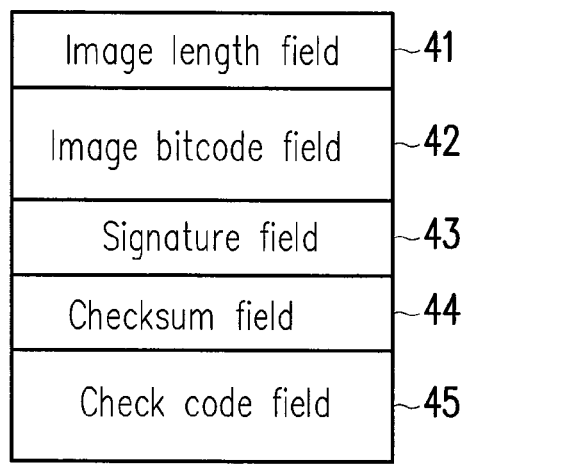
FIG. 4 is a diagram illustrating the format of a firmware image according to an embodiment of the present disclosure.

FIG. 4 is a diagram illustrating the format of a firmware image according to an embodiment of the present disclosure. Referring to FIG. 4, taking the firmware image storage area 314 storing the first firmware image as an example, the firmware image storage area 314 includes an image length field 41, an image bitcode field 42, a signature field 43, a checksum field 44, and a check code field 45.

The image length field 41 stores the length information of the first firmware image, and the length information is used for inquiring information of other fields (for example, the start address or bit number of each field). The image bitcode field 42 stores an image bitcode (referred to as the first image bitcode thereinafter) of the first firmware image (i.e., the main program of the first firmware image). The signature field 43 stores a signature (referred to as the first signature thereinafter) of the first firmware image. The checksum field 44 stores a checksum of the first firmware image. The check code field 45 stores a check code (referred to as the first check code thereinafter) of the first firmware image. In the present embodiment, the check code may be a cyclic redundancy check (CRC). However, the type of the check code can be determined according to the actual requirement. In the present embodiment, the lengths of the firmware image storage area 314 and the fields can be adjusted according to the actual requirement.

Particularly, all or each of the signature of the first firmware image in the signature field 43, the checksum of the first firmware image in the checksum field 44, and the check code of the first firmware image in the check code field 45 can be used for verifying whether the first firmware image is legal or complete. Additionally, the formats of the second firmware image and the firmware image storage area 324 can be understood by referring to those of the first firmware image and the firmware image storage area 314 therefore will not be described herein.

Figure 5:
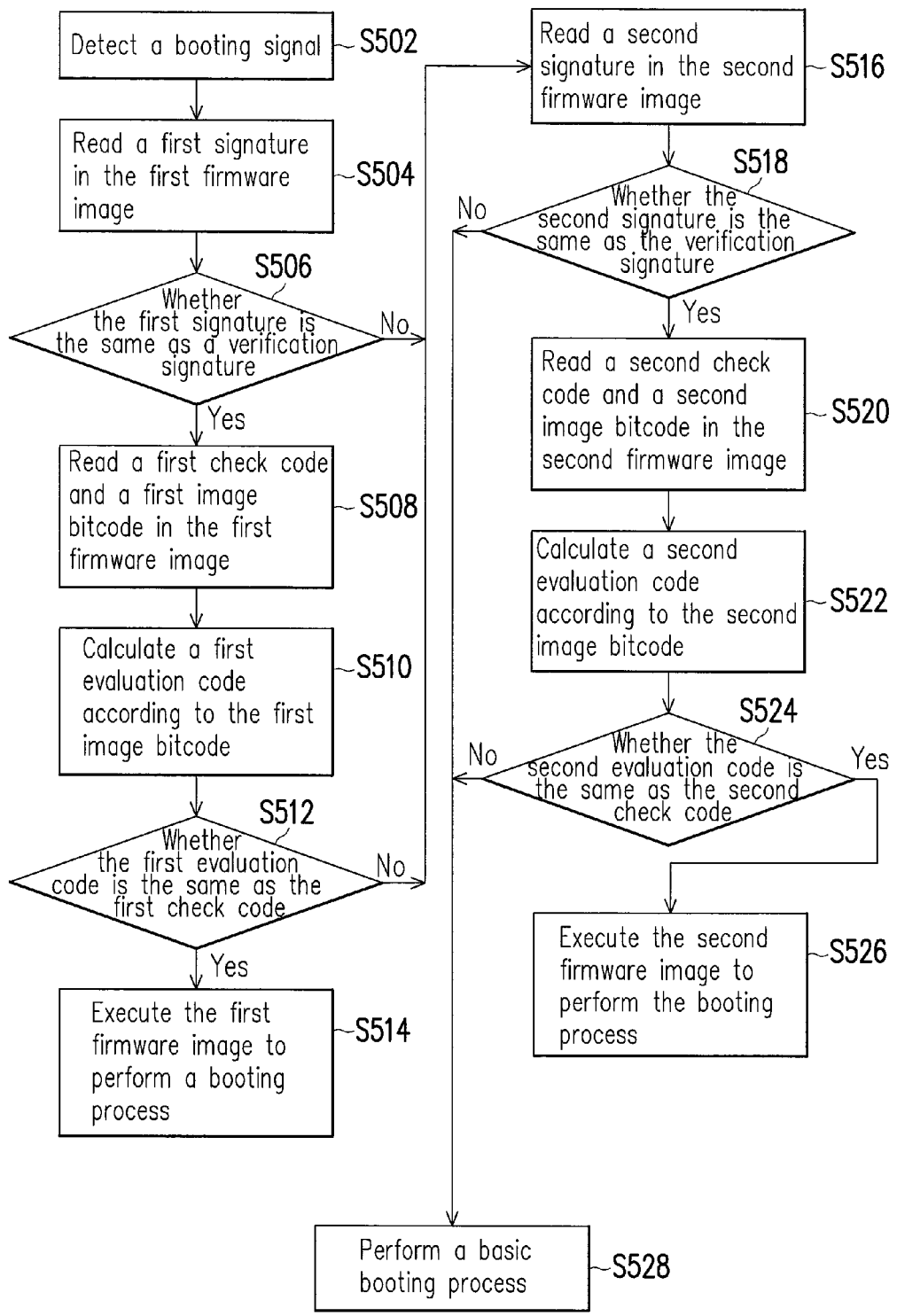
FIG. 5 is a flowchart of a booting method according to an embodiment of the present disclosure.

FIG. 5 is a flowchart of a booting method according to an embodiment of the present disclosure. Referring to both FIG. 1 and FIG. 5, in step S502, the processor 128 detects a booting signal or whether the SoC 12 is powered on. If the processor 128 detects the booting signal or that the SoC 12 is powered on, the processor 128 reads the first signature in the first firmware image from the ROM 122 (for example, from the signature field 43 in FIG. 4).

For example, as shown in FIG. 3, the processor 128 reads information in the firmware image storage area 314 by starting from the address 0X0080 in the ROM 122. Then, in step S506, the processor 128 reads a pre-stored verification signature from the ROM 122 and determines whether the first signature is the same as the verification signature. If the first signature is the same as the verification signature, in step S508, the processor 128 reads the first check code and the first image bitcode in the first firmware image from the ROM 122 (for example, from the check code field 45 and the image bitcode field 42 in FIG. 4), stores the first check code into the data memory 124, and stores the first image bitcode into the programming memory 126.

Next, in step S510, the processor 128 calculates a first evaluation code according to the first image bitcode. After that, in step S512, the processor 128 determines whether the first evaluation code is the same as the first check code. If the first evaluation code is the same as the first check code (which means the first firmware image is a normal and complete firmware image), in step S514, the processor 128 executes the first image bitcode of the first firmware image stored in the programming memory 126 to perform the booting process.

On the other hand, if the processor 128 determines in step S506 that the first signature is different from the verification signature or in step S512 that the first evaluation code is different from the first check code (which means the first firmware image is damaged or incomplete), in step S516, the processor 128 reads the signature (referred to as the second signature thereinafter) of the second firmware image from the external memory 11 and stores the second signature into the data memory 124.

For example, as shown in FIG. 3, the processor 128 reads information in the firmware image storage area 324 by starting from the address 0X10080 in the external memory 11. Then, in step S518, the processor 128 determines whether the second signature is the same as the pre-stored verification signature in the ROM 122. If the first signature is the same as the verification signature, in step S520, the processor 128 reads the check code (referred to as the second check code thereinafter) and the image bitcode (referred to as the second image bitcode thereinafter) in the second firmware image from the external memory 11, stores the second check code into the data memory 124, and stores the second image bitcode into the programming memory 126.

Next, in step S522, the processor 128 calculates a second evaluation code according to the second image bitcode. After that, in step S524, the processor 128 determines whether the second evaluation code is the same as the second check code. If the second evaluation code is the same as the second check code (which means the second firmware image is legal and complete), in step S526, the processor 128 executes the second image bitcode of the second firmware image stored in the programming memory 126 to perform the booting process.

On the other hand, if the processor 128 determines in step S518 that the second signature is different from the verification signature or in step S524 that the second evaluation code is different from the second check code (which means the verification of the second firmware image fails or the second firmware image is incomplete), in step S528, the processor 128 executes the basic booting process stored in the ROM 122.

In the present embodiment, the processor 128 may also record a retry number into the data memory 124 and initializes the retry number (for example, sets the retry number to 0) every time when the booting signal is detected or the SoC 12 is powered on. During the verification of the first firmware image, if the processor 128 determines that the first firmware image is damaged, the processor 128 determines whether to verify the first firmware image again or verify the second firmware image instead according to the retry number. During the verification of the second firmware image, the processor 128 also determines whether to verify the second firmware image again or perform the basic booting process according to the retry number.

Additionally, in the present embodiment, if the processor 128 determines to execute the first firmware image to perform the booting process, the processor 128 reads the first assisting data from the ROM 122 and performs a first setting operation on the SoC 12 according to the first assisting data. For example, as shown in FIG. 3, the first assisting data is data stored in the chip function storage area 312 and/or the firmware information storage area 316.

If the processor 128 determines to execute the second firmware image to perform the booting process, the processor 128 reads the second assisting data from the external memory 11 and performs a second setting operation on the SoC 12 according to the second assisting data. For example, as shown in FIG. 3, the second assisting data is data stored in the chip function storage area 322 and/or the firmware information storage area 326. In addition, the first setting operation and the second setting operation may be additional settings performed on hardware resources (for example, the power supply) of the SoC 12 or operations for adding user-defined names and strings into the system.

Additionally, in an embodiment, the external memory 11 further stores a third firmware image. If the processor 128 verifies the second firmware image and the verification fails, the processor 128 reads the third firmware image from the external memory 11 and determines whether the third firmware image is legal or complete.

If the third firmware image is legal and complete, the processor 128 executes the third firmware image to perform the booting process. If the verification of the third firmware image also fails, the processor 128 performs the basic booting process.

In the present embodiment, the processor 128 receives an update command from an input interface and updates the second firmware image stored in the external memory 11 or adds a third firmware image into the external memory 11 according to the update command. For example, assuming that the SoC 12 is a SoC supporting USB 3.0, the SoC 12 includes a USB interface, and the processor 128 receives an update command from the USB interface. The update command may include a write command and a new firmware image.

After the processor 128 receives the update command, the processor 128 selects one or more firmware images in the external memory 11 according to the write command in the update command and updates the selected one or more firmware images by using the new firmware image. For example as shown in FIG. 3, if the write command instructs to update the firmware image stored in the firmware image storage area 324 of the external memory 11 by using a new firmware image, the processor 128 writes the new firmware image into the firmware image storage area 324 by starting from the address 0x10080 in the external memory 11.

Additionally, the processor 128 may also update information stored in all or each of the chip function storage area 322, the firmware image storage area 324, and the firmware information storage area 326 of the external memory 11 according to the update command to improve the flexibility in using the SoC provided by the present disclosure.

It should be mentioned that the addresses of the first firmware image and the second firmware image in the external memory 11 and/or the ROM 122 can be adaptively determined by the processor 128 during the booting process of the SoC 12. In other words, as shown in FIG. 3, the processor 128 can actually consider the firmware image stored in the first storage area 31 as the first firmware image and the firmware image stored in the second storage area 32 as the second firmware image. Or, the processor 128 may also consider the firmware image stored in the second storage area 32 as the first firmware image and the firmware image stored in the first storage area 31 as the second firmware image. The firmware images can be defined according to different situations.

For example, in an embodiment, when the processor 128 updates the firmware image stored in the external memory 11, the processor 128 simultaneously updates a firmware update information stored in the external memory 11. After that, during the booting process of the SoC 12, the processor 128 inquires the firmware update information and determines the addresses of the first firmware image and the second firmware image according to the firmware update information. For example, by inquiring the firmware update information, the processor 128 can select the firmware image of the latest version or having the highest priority among one or more firmware images in the ROM 122 as the first firmware image and select the firmware image of the latest version or having the highest priority among one or more firmware images in the external memory 11 as the second firmware image. After the verification of the first and/or the second firmware image of the latest version or having the highest priority fails, the processor 128 can also read other firmware images according to the firmware update information and repeat aforementioned verification operations, which will not be described herein.

Moreover, the firmware update information may also be set up by the processor 128 according to user's operations (for example, defining the priorities of different firmware images).

Particularly, the firmware update information may also include identification information (for example, update time) of the firmware images stored in different firmware image storage areas. Thereby, the processor 128 can consider a firmware image updated at a later time in the external memory 11 as the second firmware image and a firmware image updated at a earlier time in the external memory 11 as a third firmware image read after the verification of the second firmware image fails according to the firmware update information. However, the present disclosure is not limited thereto.

As described above, the present disclosure provides a SoC and a booting method thereof, in which two or more firmware images are provided in advance, so that during the booting process of the SoC, a legal and/or complete firmware image can be loaded to complete the booting process.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A system-on-chip (SoC), coupled to an external memory, the SoC comprising:
 a read only memory (ROM), storing a first firmware image and a basic booting process;
 a processor, coupled to the ROM, reading the first firmware image from the ROM, and verifying a state of the first firmware image,
 wherein when the first firmware image is normal, the processor executes the first firmware image to perform a booting process,
 when the first firmware image is damaged, the processor reads a second firmware image from the external memory and verifies whether the second firmware image is legal;
 wherein when the second firmware image is legal, the processor executes the second firmware image to perform the booting process,
 when the second firmware image is illegal, the processor executes the basic booting process,
 wherein the ROM has a first storage area,
 wherein the first storage area stores the first firmware image and first assisting data,
 wherein the first assisting data comprises device setting information of the SoC and user-defined information related to the first firmware image,
 wherein the first storage area comprises a chip function storage area, a firmware image storage area and a firmware information storage area,
 wherein the chip function storage area is for storing the device setting information of the SoC,
 wherein the firmware image storage area is for storing the first firmware image,
 wherein the firmware information storage area is for storing the user-defined information related to the first firmware image,
 wherein the processor reads the first assisting data from the ROM and performs a first setting operation on the SoC according to the first assisting data when the processor executes the first firmware image to perform the booting process,
 wherein the external memory has a second storage area,
 wherein the second storage area stores the second firmware image and second assisting data,
 wherein the processor reads the second assisting data from the external memory and performs a second setting operation on the SoC according to the second assisting data when the processor executes the second firmware image to perform the booting process.

2. The SoC according to claim 1, wherein the processor reads a first signature in the first firmware image from the ROM and determines whether the first signature is the same as a verification signature, and when the first signature is different from the verification signature, the processor determines that the first firmware image is damaged.

3. The SoC according to claim 2, wherein when the first signature is the same as the verification signature, the processor reads a first check code and a first image bitcode in the first firmware image from the ROM, calculates a first evaluation code according to the first image bitcode, and determines whether the first evaluation code is the same as the first check code,
 wherein when the first evaluation code is the same as the first check code, the processor determines that the first firmware image is normal.

4. The SoC according to claim 1, wherein the processor reads a second signature in the second firmware image from the external memory and determines whether the second signature is the same as a verification signature,
 wherein when the second signature is different from the verification signature, the processor determines that the verification of the second firmware image fails.

5. The SoC according to claim 4, wherein when the second signature is the same as the verification signature, the processor reads a second check code and a second image bitcode in the second firmware image from the external memory, calculates a second evaluation code according to the second image bitcode, and determines whether the second evaluation code is the same as the second check code, wherein when the second evaluation code is the same as the second check code, the processor determines that the verification of the second firmware image succeeds.

6. The SoC according to claim 1, wherein the processor further updates the second firmware image stored in the external memory or adds a third firmware image into the external memory according to an update command.

7. The SoC according to claim 1, wherein the external memory stores a third firmware image,
wherein when the verification of the second firmware image fails, the processor reads the third firmware image from the external memory and verifies whether the third firmware image is legal, wherein when the verification of the third firmware image succeeds, the processor executes the third firmware image to perform the booting process.

8. A booting method, adapted to a system-on-chip (SoC), wherein the SoC comprises a processor, the booting method comprising:
providing a read only memory (ROM), wherein the ROM stores a first firmware image and a basic booting process, wherein the ROM has a first storage area, wherein the first storage area stores the first firmware image and first assisting data, wherein the first assisting data comprises device setting information of the SoC and user-defined information related to the first firmware image, wherein the first storage area comprises a chip function storage area, a firmware image storage area and a firmware information storage area, wherein the chip function storage area is for storing the device setting information of the SoC, wherein the firmware image storage area is for storing the first firmware image, wherein the firmware information storage area is for storing the user-defined information related to the first firmware image;
providing an external memory, wherein the external memory stores a second firmware image, wherein the external memory has a second storage area, wherein the second storage area stores the second firmware image and second assisting data;
reading the first firmware image from the ROM and verifying a state of the first firmware image by using the processor;
when the first firmware image is normal, executing the first firmware image to perform a booting process;
when the first firmware image is damaged, reading the second firmware image from the external memory and verifying whether the second firmware image is legal; and
when the verification of the second firmware image succeeds, executing the second firmware image to perform the booting process,
when the second firmware image is illegal, the processor executes the basic booting process;
when the first firmware image is executed to perform the booting process, reading the first assisting data from the ROM and performing a first setting operation on the SoC according to the first assisting data; and
when the second firmware image is executed to perform the booting process, reading the second assisting data from the external memory and performing a second setting operation on the SoC according to the second assisting data.

9. The booting method according to claim 8, wherein the step of reading the first firmware image from the ROM and verifying the state of the first firmware image by using the processor comprises:
reading a first signature in the first firmware image from the ROM;
determining whether the first signature is the same as a verification signature; and
when the first signature is different from the verification signature, determining that the first firmware image is damaged.

10. The booting method according to claim 9, wherein the step of reading the first firmware image from the ROM and verifying the state of the first firmware image by using the processor further comprises:
when the first signature is the same as the verification signature, reading a first check code and a first image bitcode in the first firmware image from the ROM;
calculating a first evaluation code according to the first image bitcode;
determining whether the first evaluation code is the same as the first check code; and
when the first evaluation code is the same as the first check code, determining that the first firmware image is normal.

11. The booting method according to claim 8, wherein the step of reading the second firmware image from the external memory and verifying whether the second firmware image is legal comprises:
reading a second signature in the second firmware image from the external memory, and determining whether the second signature is the same as a verification signature; and
when the second signature is different from the verification signature, determining that the verification of the second firmware image fails.

12. The booting method according to claim 11, wherein the step of reading the second firmware image from the external memory and verifying whether the second firmware image is legal further comprises:
when the second signature is the same as the verification signature, reading a second check code and a second image bitcode in the second firmware image from the external memory;
calculating a second evaluation code according to the second image bitcode;
determining whether the second evaluation code is the same as the second check code; and
when the second evaluation code is the same as the second check code, determining that the verification of the second firmware image succeeds.

13. The booting method according to claim 8 further comprising:
updating the second firmware image stored in the external memory or adding a third firmware image into the external memory according to an update command.

14. The booting method according to claim 13 further comprising:
simultaneously updating a firmware update information; and
during the booting process of the SoC, inquiring the firmware update information, and determining addresses of the first firmware image and the second firmware image according to the firmware update information.

15. The booting method according to claim 8 further comprising:
when the verification of the second firmware image fails, reading a third firmware image from the external memory, and verifying whether the third firmware image is legal; and when the verification of the third firmware image succeeds, executing the third firmware image to perform the booting process.

* * * * *